US006488973B1

(12) United States Patent
Wright

(10) Patent No.: US 6,488,973 B1
(45) Date of Patent: Dec. 3, 2002

(54) METHOD OF MAKING A COOKING POUCH CONTAINING A RAW PROTEIN PORTION, A RAW OR BLANCHED VEGETABLE PORTION AND A SAUCE

(75) Inventor: Leah Kay Wright, Rogers, AR (US)

(73) Assignee: Food Talk, Inc., Rogers, AR (US)

( * ) Notice: Subject to any disclaimer, the term of this patent is extended or adjusted under 35 U.S.C. 154(b) by 0 days.

(21) Appl. No.: 09/195,689

(22) Filed: Nov. 19, 1998

Related U.S. Application Data

(63) Continuation of application No. 09/166,172, filed on Oct. 5, 1998, now abandoned.

(51) Int. Cl.[7] ............... A23B 4/07; B65D 85/72
(52) U.S. Cl. .............. 426/114; 426/126; 426/129; 426/393; 426/394; 426/412; 426/415; 426/510; 426/523; 426/524
(58) Field of Search ................. 426/113, 114, 426/126, 129, 393, 410, 394, 412, 415, 510, 524, 523

(56) References Cited

U.S. PATENT DOCUMENTS 2,555,584 A  *  6/1951  Fairbank ............... 99/174
2,643,952 A  *  6/1953  Crowther et al. ....... 99/195
2,752,252 A  *  6/1956  Condon ................. 99/194

(List continued on next page.)

FOREIGN PATENT DOCUMENTS

| CH | 684985 A5 | * | 2/1995 |
| DE | 29800949 U1 | * | 5/1999 |
| EP | 826314 A1 | * | 3/1998 |
| FR | 2663205 A | * | 12/1991 |
| FR | 2730908 A1 | * | 8/1996 |
| GB | 676369 | * | 7/1952 |
| GB | 2 240 253 | | 7/1991 |
| JP | 59017943 A | * | 1/1984 |
| JP | 01168247 A | * | 7/1989 |
| JP | 09313135 A | * | 5/1996 |
| JP | 09191860 A | * | 7/1997 |
| JP | 09313135 A | | 12/1997 |

Primary Examiner—Keith Hendricks
Assistant Examiner—Drew Becker
(74) Attorney, Agent, or Firm—Jacobson Holman PLLC

(57) ABSTRACT

A frozen food product which includes a raw protein portion, a raw or an only partially cooked or blanched vegetable portion and a sauce, contained in a sealed cooking pouch made primarily of paper and a susceptor layer, preferably aluminum, which may be placed in an oven or microwave oven so as to cook the contents of the cooking pouch. The raw protein product is preferably one of fish, beef, poultry, pork or veal. The vegetables are raw or blanched vegetables such as julienne peppers, celery, carrots, onions, zucchini or broccoli. The blanched vegetables are only partially cooked so that the time remaining to complete cooking of the vegetables is approximately the same as the time required to cook the raw protein portion.

6 Claims, 7 Drawing Sheets

U.S. PATENT DOCUMENTS

| | | | | |
|---|---|---|---|---|
| 2,801,930 A | | 8/1957 | Paulucci | 99/193 |
| 2,951,765 A | | 9/1960 | Robson | 99/192 |
| 2,969,292 A | | 1/1961 | Heller | 99/171 |
| 3,607,315 A | | 9/1971 | Partyka | 99/195 |
| 3,615,646 A | | 10/1971 | Neely et al. | 99/1 |
| 3,615,711 A | * | 10/1971 | Markus et al. | 99/171 H |
| 3,718,481 A | | 2/1973 | Joaquin | 99/111 |
| 3,808,342 A | * | 4/1974 | Brandin | 426/164 |
| 3,873,735 A | | 3/1975 | Chalin et al. | 426/87 |
| 3,881,023 A | | 4/1975 | Wilson | 426/132 |
| 3,911,156 A | * | 10/1975 | Swanson | 426/393 |
| 4,328,254 A | | 5/1982 | Waldburger | 426/393 |
| 4,358,466 A | | 11/1982 | Stevenson | 426/106 |
| 4,641,005 A | * | 2/1987 | Seiferth | 219/10.55 E |
| 4,735,513 A | * | 4/1988 | Watkins et al. | 383/116 |
| 4,867,995 A | * | 9/1989 | Oaks | 426/234 |
| 4,890,439 A | * | 1/1990 | Smart et al. | 53/410 |
| 4,911,938 A | * | 3/1990 | Fisher et al. | 426/107 |
| 5,059,436 A | * | 10/1991 | Clark | 426/107 |
| 5,227,599 A | * | 7/1993 | Mason et al. | 219/10.55 E |
| 5,268,189 A | | 12/1993 | Doerter | 426/573 |
| 5,370,895 A | | 12/1994 | Doerter | 426/573 |
| 5,412,187 A | | 5/1995 | Walters et al. | 219/728 |
| 5,489,766 A | | 2/1996 | Walters et al. | 219/730 |
| 5,530,231 A | | 6/1996 | Walters et al. | 219/730 |
| 5,679,392 A | | 10/1997 | Schegan et al. | 426/412 |
| 5,736,186 A | * | 4/1998 | Holdren et al. | 426/646 |
| 5,861,184 A | * | 1/1999 | Ishino et al. | 426/107 |
| 6,054,698 A | | 4/2000 | Mast | 219/730 |
| 6,063,423 A | * | 5/2000 | Virtanen | 426/302 |
| 6,183,789 B1 | * | 2/2001 | Nilsson et al. | 426/113 |

* cited by examiner

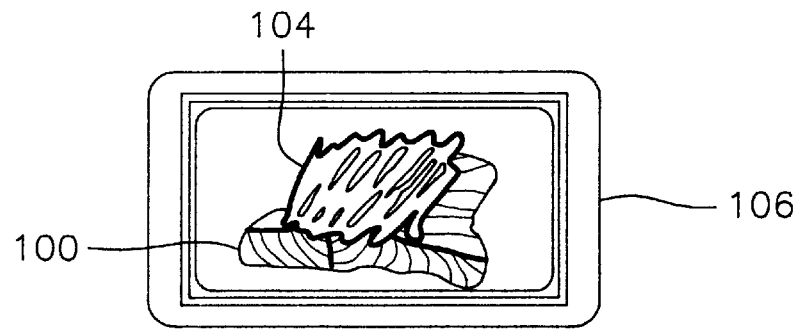
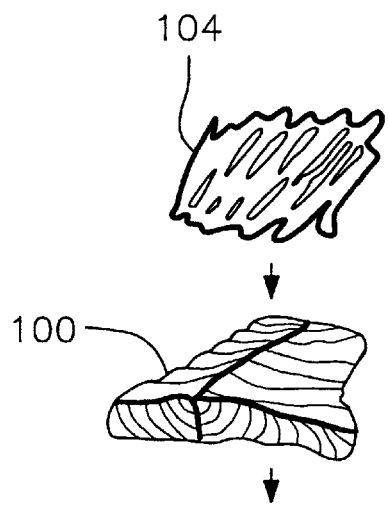
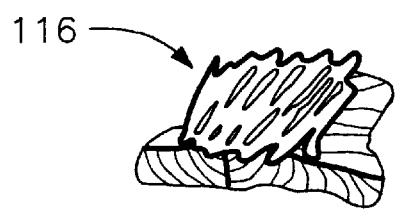
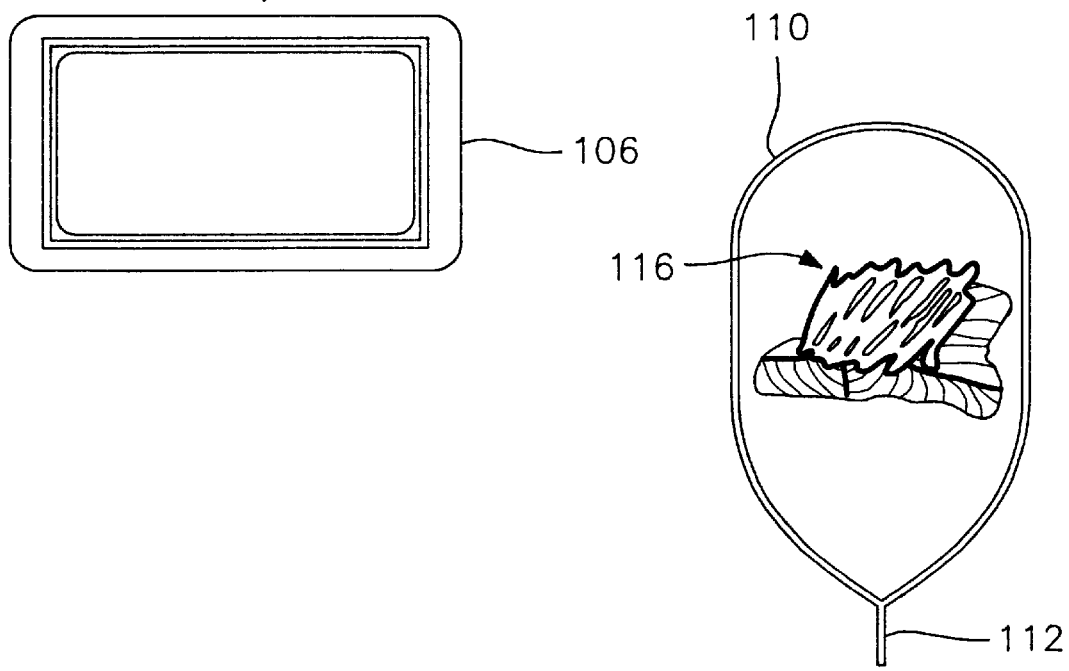

FIG. 4
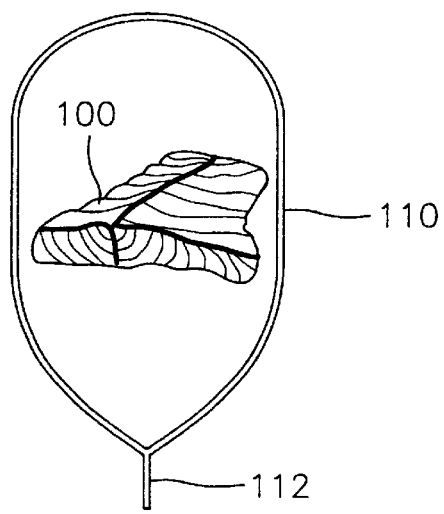
FIG. 5A
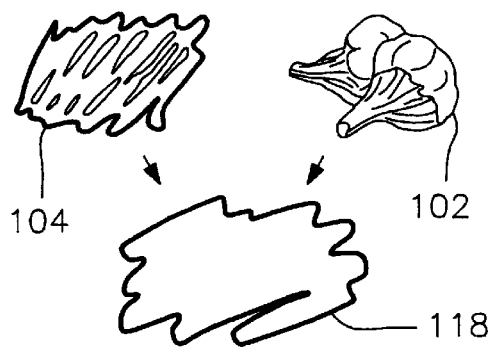
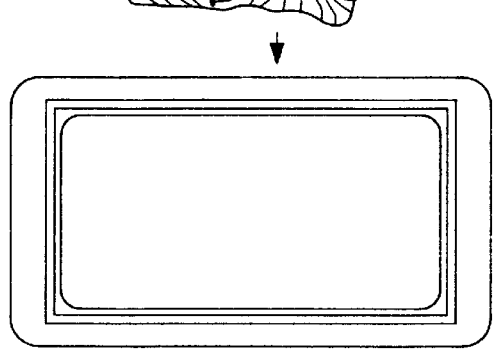
FIG. 5B
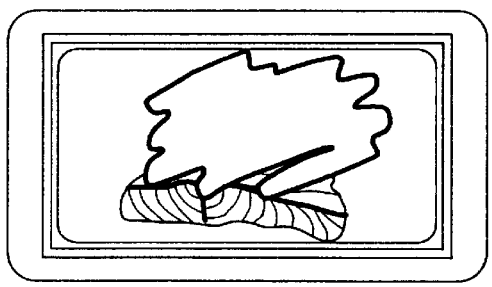
FIG. 5C
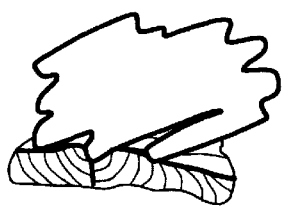
FIG. 5D
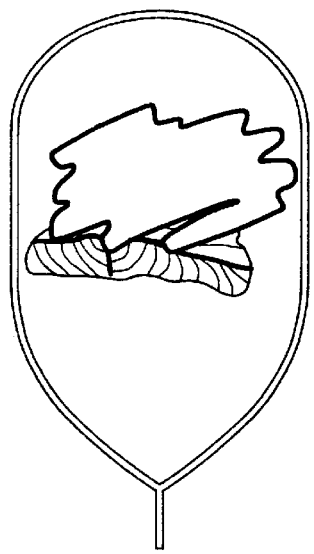

METHOD OF MAKING A COOKING POUCH CONTAINING A RAW PROTEIN PORTION, A RAW OR BLANCHED VEGETABLE PORTION AND A SAUCE

This application is a continuing application of application Ser. No. 09/166,172, filed Oct. 5, 1998, now abandoned hereby incorporated in its entirety by reference.

FIELD OF THE INVENTION

The present invention relates to the field of frozen food products including a raw protein portion. The protein may be by itself, or alternatively, the protein portion may include at least one of a raw or blanched vegetable portion or a sauce sealed in a cooking pouch formed of a sheet material having a paper outermost layer and a plastic coated metal innermost layer.

BACKGROUND OF THE INVENTION

In today's hurried world, little time is left for the involved processes of cooking a gourmet meal. Accordingly, resort has been made to taking advantage of processed or frozen, prepared meals. These meals come in various forms of precooked food and provide a wide range of entrees and flavors. However, the offerings of the processed food industry have not yet achieved the quality of a restaurant prepared meal. The reheating of frozen, precooked food cannot provide the flavor and texture of fresh food.

For example, a popular dish in restaurants which must be prepared from all fresh ingredients is "pompano in a bag" or "fillets de poisson en papillotes". This specialty item traditionally includes fish which is cooked in a parchment paper bag or using greaseproof (waxed) paper. The bag is crumbled at its open end to form a loose closing of the bag so as, to a limited extent, produce a build-up of steam pressure in the bag during a cooking process. However, this type of quality food product has previously been unavailable to the frozen food mass market.

SUMMARY OF THE INVENTION

Accordingly, it is an object of the present invention to provide a frozen food product which includes only a raw protein, or alternatively, in addition to the raw protein portion, at least one of a raw or an only partially cooked or blanched vegetable portion and a sauce, contained in a sealed cooking pouch made primarily of paper and a susceptor (microwave active) or strengthening layer, preferably aluminum, which may be placed in either an oven or microwave so as to aid in cooking the contents of the frozen cooking pouch by radiant and conductive heat.

The contents of the cooking pouch is a raw protein product, preferably one of fish, beef, poultry, pork or veal. Alternatively, the fresh or frozen raw protein includes two protein layers with a middle layer of moist stuffing. The moist stuffing includes cooked chopped onions, garlic, celery, parsley mixed with butter or butter substitute and bread crumbs.

In addition, vegetables may be added to the protein which are raw or blanched vegetables such as julienne peppers, chopped celery, carrots, onions, zucchini or broccoli. The blanched vegetables are only partially cooked so that the time remaining to complete cooking of the vegetables is approximately the same as the time required to cook the raw protein product.

After the protein and vegetable ingredients are stacked together in a preparation tray, a sauce may be added to the protein and vegetable ingredients. The protein, vegetables and sauce on the preparation tray are frozen. The protein, vegetables and sauce are removed as a frozen solid block from the tray, and in a preferred embodiment, a sheet of material is wrapped around the frozen solid block. Alternatively, the sauce may be added to the protein without the vegetable portion.

The sauce added to the protein and to the optional vegetables can include at least one of the following ingredients: garlic butter, pecan butter, lemon dill, meuniere, etoufee, etoufee with shrimp and/or dijon garlic. In addition, prepared dried seasonings may be used in combination with the prepared sauce or separate from the prepared sauce.

The pouch is formed on a horizontal wrapper machine. Doboy Packaging Machine Inc. of New Richmond, Wis. manufactures one such machine. The approximate size of the pouch sheet material will have a web width of 11 inches with a cut off length of 9 inches. Roll stock of the pouch sheet material is fed into the wrapper (sealing) machine and a pouch is formed on the production line.

The pouch is formed by a feed of sheet material in which a seal, called a fin seal, is formed on the underside of the food product. The material is cut at the desired length and moves into another sealing position where both ends of the pouch are sealed. The now complete cooking pouch is placed into a retail selling box. The fin seal area is of sufficient width to facilitate printing of "THIS SIDE UP FOR COOKING" on the sheet material of the fin seal. The location of the fin seal on top of the cooking pouch is necessary to contain all of the cooking juices in the pouch while food is cooking.

Alternatively, a pouch is formed around the food ingredients by folding a sheet of material and sealing three opposed edges to form a rectangular shaped pouch. By a different approach, two separate sheets of the package material are placed on top of each other and four side edges are sealed together to form a pouch.

The sheet material forming the pouch includes four layers. The thickest layer forming the outer surface of the formed pouch is formed by opaque, stiff paper, similar to parchment paper, having a thickness of approximately 2.5 mils. An adhesive layer of approximately 0.1 mils is used to attach a susceptor layer, preferably aluminum, of approximately 0.48 mils to the paper layer. A plastic layer, preferably polyester, forming the inner layer of the pouch is approximately 0.02 mils thick. A total sheet material thickness of 3.1 mils is preferred.

The adhesive is a water based material designed to maintain its adhesive properties when exposed to high temperatures. The polyester layer is a co-extruded, heat sealable polyester that is U.S. Food and Drug Administration (FDA) approved for direct food contact. The polyester layer, forming the innermost layer of the pouch, facilitates the heat sealing of opposed side edges or overlapping sheets of pouch material. The pouch sheet material is available from Printpack, Inc. of Atlanta, Georgia as product code MW260A.

The assembly of the cooking pouch and the filling of the cooking other than the use of a packaging machine, as previously described, pouch is performed according to the following method.

Other than by the use of a packaging machine, as previously described, a cooking pouch can be formed by folding over a single sheet of pouch material and heat sealing two opposed side edges. The fold forms a third sealed edge, leaving a single side edge opening.

Alternatively, two sheets of the pouch material are laid on top of each other and three side edges are heat sealed to leave a single side edge opening. The side edge heat sealing may be performed by a device available from Doboy Packaging Machinery Inc. of New Richmond, Wis.

Fresh or frozen raw, uncooked protein product may, in one embodiment, be placed on a tray of approximately four inch by six inch dimensions. Alternatively, raw or blanched vegetables are deposited on top of the protein portion. For example, a blanched medley of julienne vegetables may be used. A liquid sauce may alternatively be deposited on the protein portion or over the protein portion and vegetables when the two are together.

The food product and the tray are frozen, after which the frozen food product may be removed from the tray and wrapped in sheet material, as previously described. The tray serves to contain the food product, primarily when a sauce is involved, when freezing the food. The frozen food can then be removed from the tray and wrapped. Alternatively, a sauce patty, in cold or frozen form, made up of sauce and julienne and diced vegetables, may be combined with the protein portion, before wrapping.

The cooking pouch will have a total package weight of approximately 2.3 to eight ounces. If a vegetable portion is included, the vegetable portion will weigh approximately 1.5 to three ounces. The protein portion of the pouch will weigh approximately 2.3 to seven ounces.

By the formation of the pouch, the protein will touch the inner surface, formed by the aluminum layer and the very thin layer of polyester. The closeness to the aluminum layer aids in allowing the protein to brown during the cooking operation by the concentrated reflection of heat onto the protein portion. In a microwave, the aluminum layer helps to absorb, reflect and transmit energy to the food product.

The assembled fresh or frozen raw protein and possibly at least one of raw or blanched vegetables and a sauce are quick frozen or maintained frozen in the cooking pouch for delivery to the consumer. The consumer removes the frozen cooking pouch product from a freezer.

There are several options for cooking the raw protein and raw or blanched vegetables contained in the cooking pouch. Cooking may be performed in a conventional oven, a convection oven or by microwave cooking (dual ovenable).

The cooking time will vary according to the cooking process used and thickness of the raw protein. However, if for example, an approximate two ounce weight of a fish filet with two ounces of sauce and 1.5 ounces of vegetables is contained in a pouch, the pouch would be cooked in a microwave at four to five minutes, depending upon the wattage of the microwave. A cooking pouch including approximately three ounces of fish filet, two ounces of sauce and two ounces of vegetables would be placed in a microwave in a frozen state and cooked from 6.5 to eight minutes, depending upon the wattage of the microwave.

Similarly, the frozen cooking pouch would be heated in a conventional or convection oven at 350 degrees Fahrenheit. Cooking times would again vary depending upon the thickness of the raw protein. However, a two ounce raw fish filet, two ounces of sauce and 1.5 ounces of raw or blanched vegetables would take approximately ten to fifteen minutes to cook in a preheated oven, whereas a three ounce raw fish filet, two ounces sauce and two ounces raw or blanched vegetables would take approximately fifteen to twenty minutes to cook in a preheated oven.

During the cooking process, the sealed pouch forms a pressure cooker type of arrangement. Steam released from the, now defrosted, raw protein and blanched vegetables, trapped in the sealed pouch aids in the cooking process. The steam reduces the cooking time and increases the flavor saturation. The sealed pouch allows the juices of the protein, sauce and vegetables to blend to season the food and provide a moist product. In addition, the steam prevents fish and other protein products, as well as the vegetables, from drying out during the cooking process. The reflective nature of the aluminum layer aids in the browning of the raw protein portion.

As an added safety feature, steam is allowed to be released through a pin hole size opening formed in one seam on the side of the pouch during the manufacturing process. If pressure is not released within approximately 20 minutes of cooking time, steam will be allowed to escape to prevent the explosion of the cooking pouch.

Accordingly, it is an object of the present invention to provide a sealed cooking pouch for cooking raw protein product, blanched vegetables and a sauce in a reduced amount of time with a mixing of the juices of the protein, sauce and vegetables to blend and season the food product.

It is still another object of the present invention to prepare a cooking pouch including frozen raw protein food product sealed in the pouch, having a paper outermost layer and a coated aluminum layer as an innermost layer.

It is still yet another object of the present invention to heat seal the side edges of a cooking pouch so as to contain a raw protein food product so that the cooking pouch is heated to cook the raw protein product in an oven or microwave.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 3A is an exploded view of the food components to be placed on a tray and frozen together with the tray.

FIG. 3B schematically illustrates the combined food products frozen on a tray.

FIG. 3C schematically illustrates the frozen food products removed from the tray.

FIG. 3D schematically illustrates the frozen food products wrapped in a sheet of pouch material forming a bottom fin seal, prior to the sealing of the ends of the formed pouch.

FIG. 4 schematically illustrates a frozen, raw fish protein portion wrapped in a sheet of pouch material forming a bottom fin seal, prior to the sealing of the ends of the formed pouch.

FIG. 5A schematically illustrates an exploded view of a vegetable portion and a sauce portion being combined into a sauce patty prior to placement on a protein portion and placement with the protein portion on a tray.

FIG. 5B schematically illustrates the protein portion and sauce patty located on a tray to freeze the contents of the tray.

FIG. 5C schematically illustrates the frozen food products removed from the tray.

FIG. 5D schematically illustrates the frozen food products wrapped in a sheet of pouch material forming a bottom fin seal, prior to the sealing of the ends of the formed pouch.

DETAILED DESCRIPTION OF THE PREFERRED EMBODIMENTS

Figure 1B:
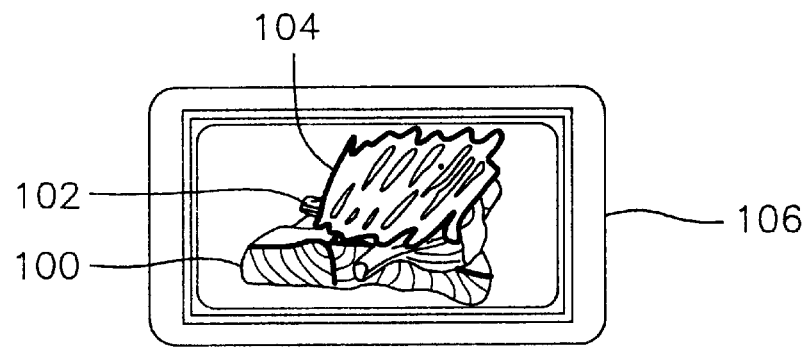
FIG. 1B schematically illustrates the combined food products frozen on a tray.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1A:
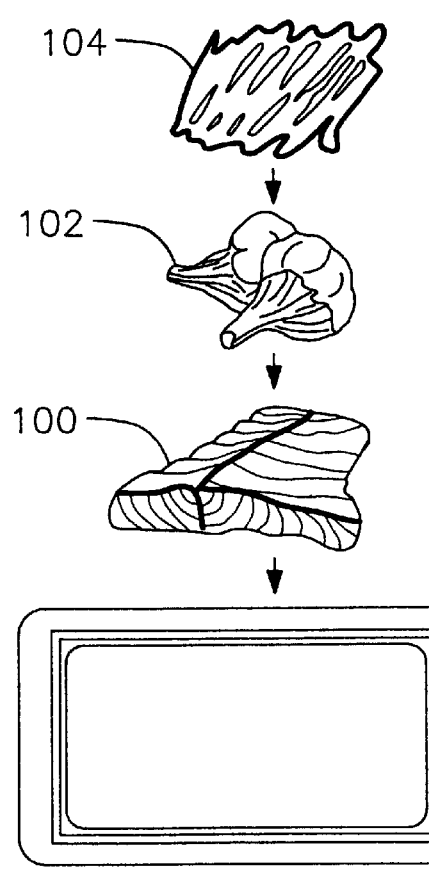
FIG. 1A is an exploded view of the food components to be placed on a tray and frozen together with the tray.
Figure 1C:
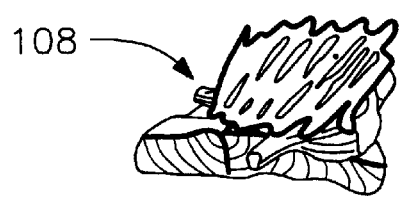
FIG. 1C schematically illustrates the frozen food products removed from the tray.
Figure 1D:
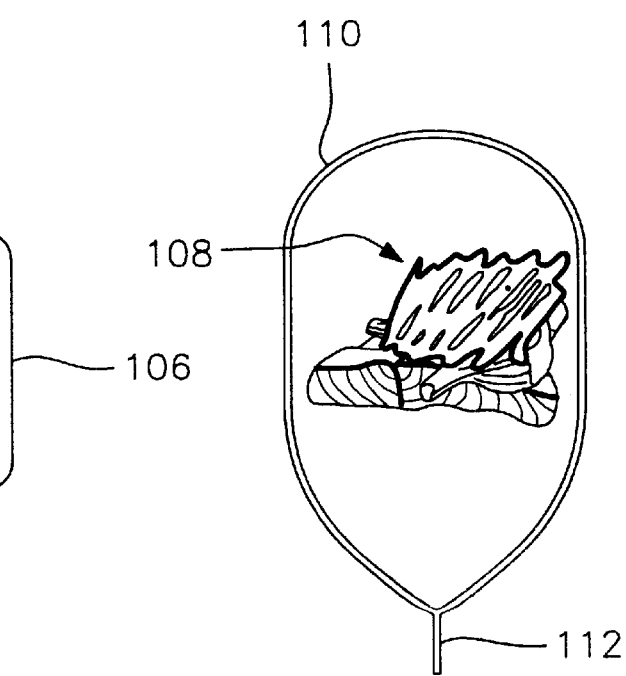
FIG. 1D schematically illustrates the frozen food products wrapped in a sheet of pouch material forming a bottom fin seal, prior to the sealing of the ends of the formed pouch.
Figure 2B:
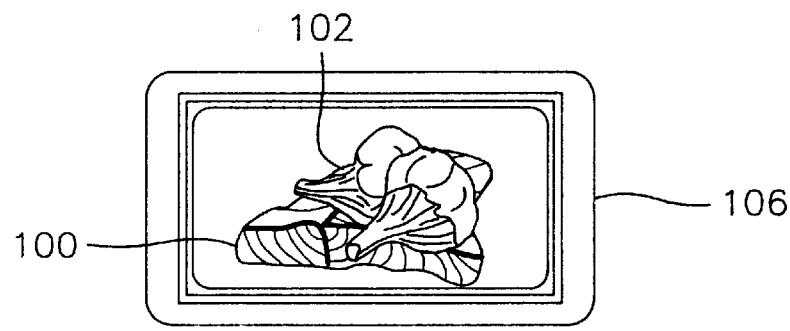
FIG. 2B schematically illustrates the combined food products frozen on a tray.
Figure 2A:
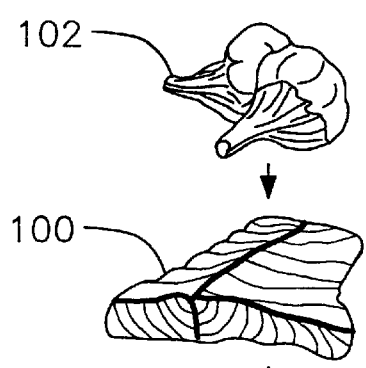
FIG. 2A is an exploded view of the food components to be placed on a tray and frozen together with the tray.
Figure 2C:
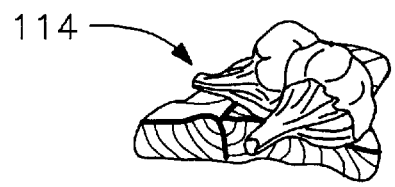
FIG. 2C schematically illustrates the frozen food products removed from the tray.
Figure 2D:
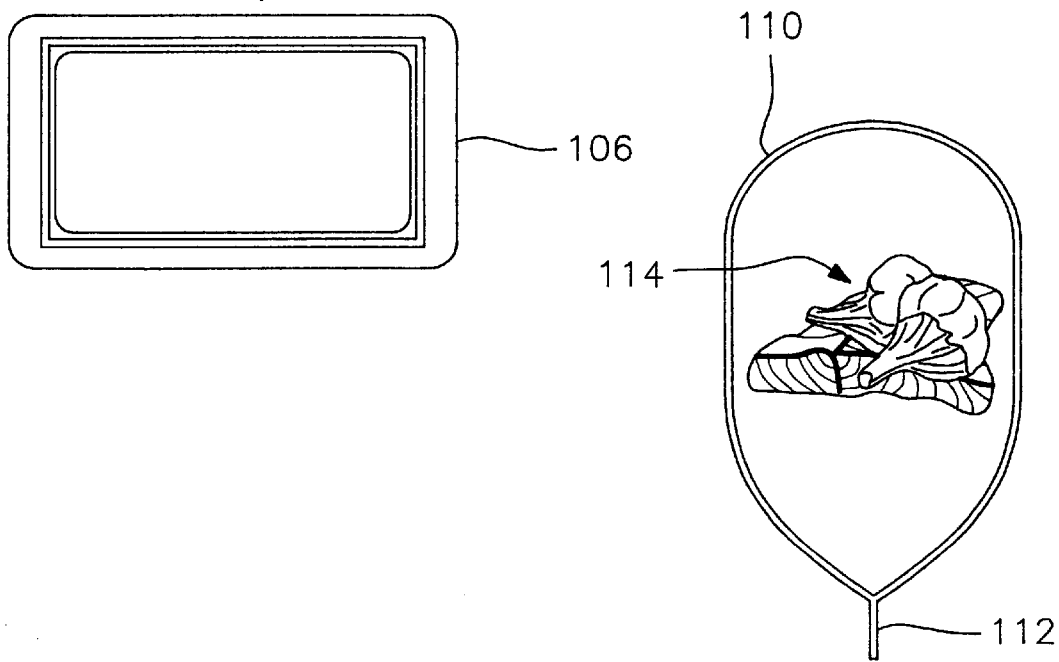
FIG. 2D schematically illustrates the frozen food products wrapped in a sheet of pouch material forming a bottom fin seal, prior to the sealing of the ends of the formed pouch.

With reference to the drawings, in general, and to FIGS. 1A through 1D in particular, with reference to the drawings, in general, an assembly of food products to be frozen and later encapsulated in a single sheet of material is shown in FIG. 1A. Specifically, a raw protein portion 100 is placed with a blanched or uncooked vegetable portion 102 and a sauce 104 on a four inch by six inch tray 106. The tray and the food products are then frozen as shown in FIG. 1B with the vegetable portion stacked on top of the protein portion and the sauce located on top of the vegetable portion and protein portion.

As a result of this freezing process, a block 108 of food product is formed which is readily removable from the tray 106. The tray is made of metal or plastic and includes a non-stick surface.

The frozen block of food 108 is introduced into a food production line where it is encapsulated in a single sheet of material 110 having fin seal 112. The opposite open ends of the thus formed pouch are subsequently sealed, as previously described.

Alternatively, as shown in FIGS. 2A through 2D, only a raw protein portion and vegetable portion 102 are placed on tray 106 to form a frozen block 114, of food product. The frozen block 114 is wrapped with a single sheet 110 of material and sealed at a bottom portion with a fin seal 112. The ends of the thus formed pouch are later sealed to completely seal the frozen block 114 of food product.

Alternatively, as shown in FIGS. 3A through 3D, a raw protein portion 100 is combined with a sauce 104 to form a frozen block 116 of food product. The frozen block 116 of food product is encapsulated with a single sheet 110 of material having a bottom fin seal 112 with subsequent end sealing of the thus formed pouch.

In FIG. 4, a frozen block of raw protein portion 100 is surrounded by a single sheet 110 of material and sealed at its bottom by fin seal 112. The end portions of the thus formed pouch are subsequently sealed.

The encapsulated food product as shown in FIGS. 1D, 2D, 3D and 4 is encapsulated in a single sheet 112 of material which includes an innermost plastic coated aluminum layer in all portions of the sheet except for the side edge regions which are sealed to close the pouch. In the side edge regions, the aluminum layer may optionally be omitted to increase the sealability of the opposite ends of the pouch and to avoid the expense of aluminum in the edge regions which are not required for the sealing of the food product.

In FIGS. 5A through 5D, the vegetable portion 102 and the sauce portion 104 are combined to make a "sauce patty" 118. The sauce patty may be composed of cold sauce and julienne and diced vegetables which is either frozen with the raw protein portion or separately frozen from the raw protein portion and added on top of the frozen raw protein portion.

Figure 6:
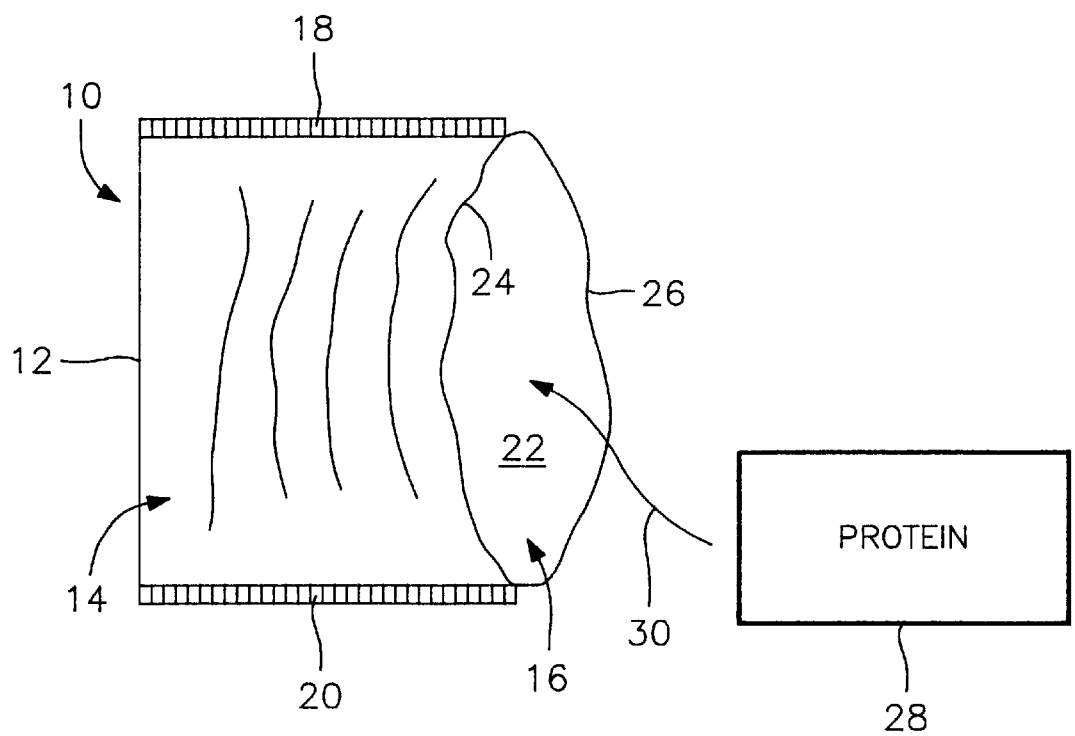
FIG. 6 is a schematic illustration of an alternate method of filling a cooking pouch having an open side with a protein portion prior to heat sealing the open side of the cooking pouch.

Alternatively, a pouch 10 may be used as shown in FIG. 6. The pouch 10 includes a single sheet of material which is folded along fold line 12 to form an upper sheet portion 14 and a lower sheet portion 16.

The opposed side edges 18 and 20 have been heat sealed to form, in combination with fold line 12, a three sided pouch. An opening 22 is formed between edge 24 of upper sheet portion 14 and edge 26 of lower sheet portion 16. Edges 24 and 26 are heat sealed together to form the cooking pouch of the present invention after the contents of the pouch are introduced into the pouch.

In the embodiment shown in FIG. 6, a raw protein portion 28 is introduced into the opening 22 of the pouch 10 in a direction of arrow 30. The raw protein portion is one of raw fish, beef, poultry, pork and veal. Raw protein portion 28 is introduced into the opening 22 of the pouch 10 so that the innermost surface of lower sheet portion 16 contacts the lower surface of the raw protein portion 28.

Figure 11:
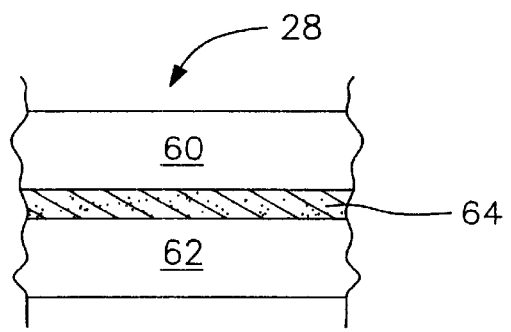
FIG. 11 is a cross sectional view of a raw protein portion including a stuffing layer located between two raw protein portion layers.

The raw protein portion 28 may be a single block as shown in FIG. 6, or, alternatively, may include two layers 60 and 62 as shown in FIG. 11. Located between layers 60 and 62 is a stuffing layer 64.

Figure 7:
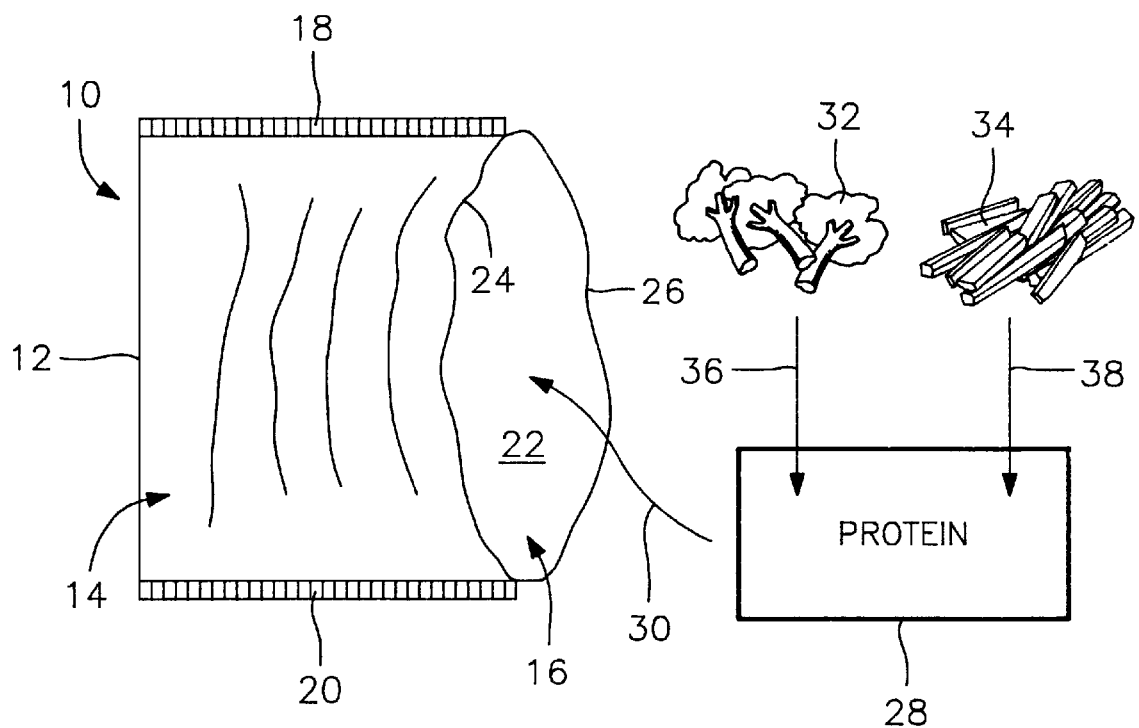
FIG. 7 is a schematic illustration of the alternate method of filling a cooking pouch having an open side with a protein portion and vegetable portion prior to heat sealing the open side of the cooking pouch.

In an alternate embodiment, as shown in FIG. 7, prior to or after placing the raw protein portion in the pouch 10, at least one of raw or blanched vegetable portions 32 and/or 34 are placed on top of the raw protein portion as indicated by the arrows 36, 38, respectively. Raw or blanched vegetable portion 32 is broccoli. Raw or blanched vegetable portion 34 is carrots.

Figure 8:
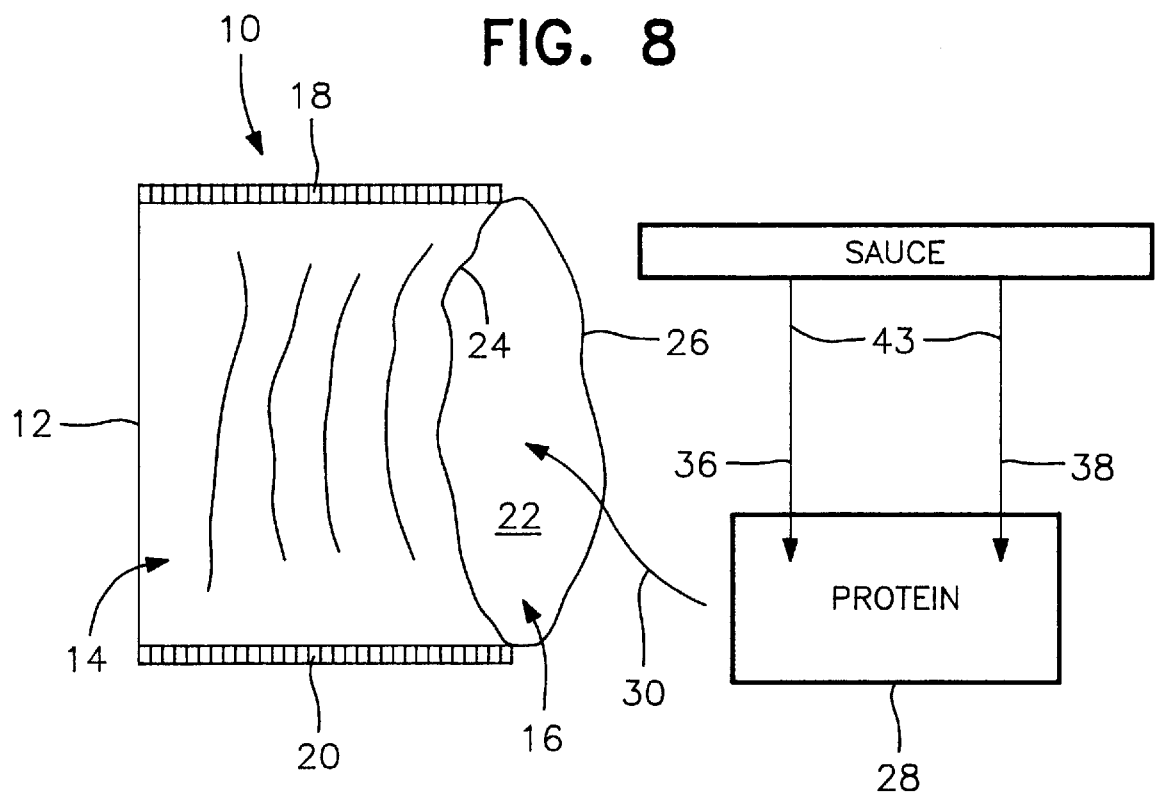
FIG. 8 is a schematic illustration of the alternate method of filling a cooking pouch having an open side with a protein portion and a sauce prior to heat sealing the open side of the cooking pouch.

Alternatively, the raw protein portion 28 may include a sauce 40, as shown in FIG. 8. Sauce 40 is introduced onto the protein portion 28 in the direction of arrows 43.

Figure 9:
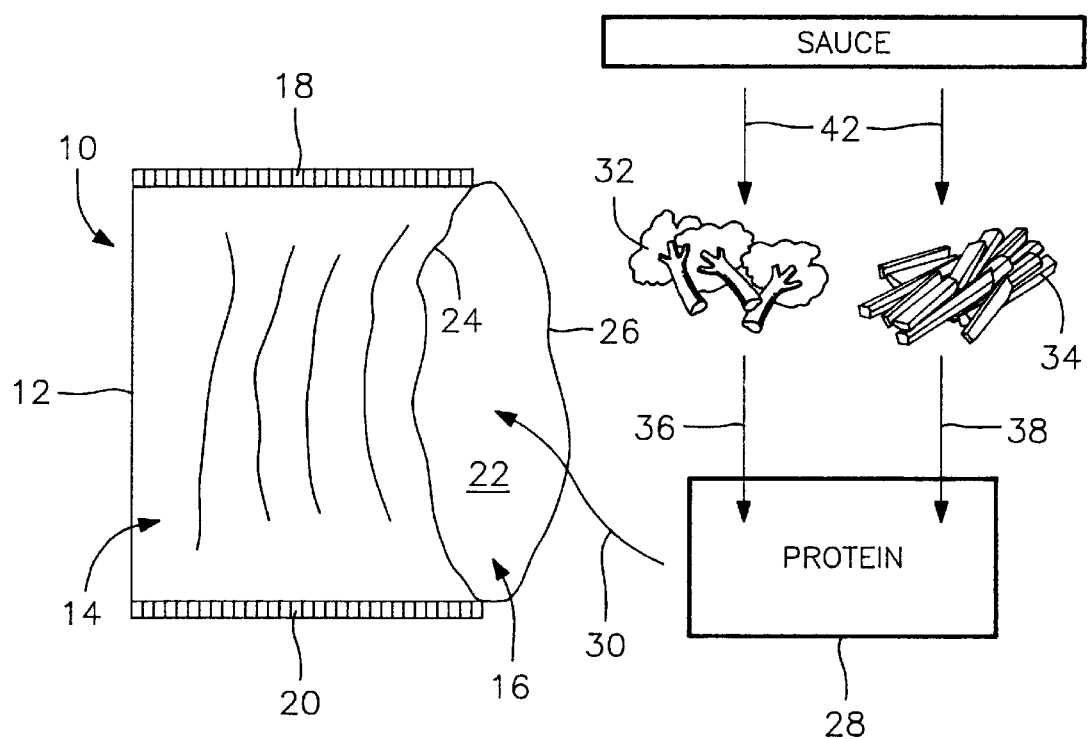
FIG. 9 is a schematic illustration of the alternate method of filling a cooking pouch having an open side with a protein portion, vegetable portion and a sauce prior to heat sealing the open side of the cooking pouch.

After placement of at least one of the raw or blanched vegetable portions 32, 34 on top of the protein portion, in an alternate embodiment, as shown in FIG. 9, a sauce 40 is introduced on top of the vegetable portion in the direction of arrows 42 so as to contact the raw protein portion 28 and the raw or blanched vegetable portion 32 and/or 34.

After the filling of the pouch with the protein portion only (FIG. 6), the protein portion and vegetable portion (FIG. 7), the protein portion and sauce (FIG. 8) or the protein portion, vegetable portion and sauce (FIG. 9), the opposed side edges 24, 26 of the opening 22 are brought into engagement and heat sealed to form a sealed cooking pouch. The pouch is then quick frozen for storage and transport to a point of purchase for a consumer.

Alternatively, the pouch 10 is formed from two sheets of material. The overlying sheets are heat sealed together along three mating side edges to form a pouch having an opening, as is shown in FIG. 6. In FIG. 6, the difference between a pouch formed from a single sheet of material and two separate sheets of material is that in the single sheet of material the fold line 12 forms one of the sealed side edges.

Figure 10:
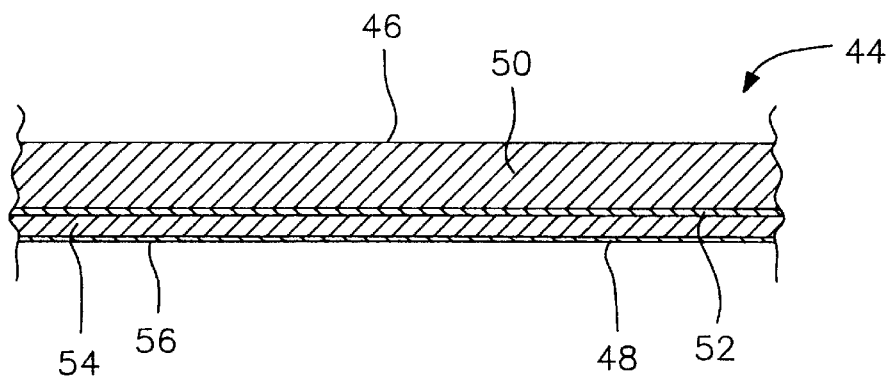
FIG. 10 is a cross sectional view of a single sheet of material used to form the cooking pouch of the present invention.

The sheet material 44, used to form the pouch 10, as shown in FIG. 10, includes four layers. Progressing from the outermost surface 46 to the innermost surface 48 when the sheet material is formed into a pouch, the layers of the sheet material are paper layer 50, adhesive layer 52, aluminum layer 54 and polyester layer 56.

The sheet material 44 is used such that the plastic coated metal layer 54 is on the interior of the formed cooking pouch 10 so as to aid in heat reflection and reduction of cooking time. This would be the situation whether the pouch is formed of a folded single sheet of material 44 or two sheets of material 44, heat sealed about their side edges.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A method of making a packaged microwaveable food product for cooking the food product within the package in a microwave oven through the microwave energy, the build-up of steam pressure, and heat transfer comprising:

forming a single frozen solid block food portion comprising a raw protein food product portion and a sauce portion by depositing a raw unfrozen protein food portion and then separately depositing a liquid sauce portion on a contained surface, and then freezing the raw protein food portion and sauce portion that were each separately deposited on said contained surface to form said single frozen solid block dimensionally confined to the dimensions of said contained surface;

removing said frozen solid block from said contained surface;

forming a pouch around the frozen solid block by enclosing said frozen solid block within a sheet material having a paper outermost layer and a plastic coated metallic susceptor layer located internally of said paper layer with said plastic coated metallic susceptor layer extending completely over said frozen solid block by placing the frozen solid block upon said sheet material and then wrapping and sealing said sheet material to completely enclose said frozen solid block within said sheet material; and maintaining the pouch filled with said frozen solid block in a frozen condition until cooking, wherein said frozen block is cookable in a microwave oven within the enclosed cooking pouch by microwave energy absorption, by steam pressure build-up, and by heat conducted from said metallic susceptor.

2. The method as claimed in claim 1, wherein at least one of said raw protein food product and said sauce contains a fat.

3. The method as claimed in claim 1, wherein said liquid sauce contains a fat.

4. A method of making a packaged microwaveable food product for cooking the food product within the package in a microwave oven comprising:

forming a dimensionally confined single frozen solid block food portion comprising a raw protein food product portion and a separate sauce by depositing a raw unfrozen protein food portion and then separately depositing a liquid sauce on a contained surface, and then freezing the raw protein food portion and liquid sauce on said contained surface to form said frozen solid block;

removing said frozen solid block from said contained surface;

forming a sealed pouch around the frozen solid block by enclosing said frozen solid block within a sheet material having a paper outermost layer and a plastic coated metallic susceptor layer located internally of said paper layer with said plastic coated metallic susceptor layer extending completely over, and in contact with, said frozen solid block by placing the frozen solid block upon said sheet material and then wrapping and sealing said sheet material to completely enclose said frozen solid block within said sheet material and to maintain said sheet material in direct contact with the frozen solid block;

forming a steam pressure relief opening in said sealed pouch; and maintaining the pouch filled with said frozen solid block in a frozen condition until cooking, wherein the frozen solid block is cookable in a microwave oven within the enclosed pouch by microwave energy absorption, by steam pressure build-up within said sealed pouch, and by heat transfer from the metallic susceptor, and through heated liquid formed by the defrosting of the frozen solid block.

5. The method as claimed in claim 4, wherein at least one of said raw protein food product and said sauce contains a fat.

6. The method as claimed in claim 4, wherein said liquid sauce contains a fat.

\* \* \* \* \*